United States Patent Office 3,050,533
Patented Aug. 21, 1962

---

3,050,533
MANUFACTURE OF ESTERS
Neil Munro and Duncan Maclean, Harrogate, England, assignors to Imperial Chemical Industries Limited, London, England, a corporation of Great Britain
No Drawing. Filed May 12, 1958, Ser. No. 734,407
Claims priority, application Great Britain Feb. 9, 1955
8 Claims. (Cl. 260—346.1)

This invention relates to an improved process for the manufacture of glycol esters of terephthalic acid. In particular, this invention is directed to an improved process for the manufacture of esters by the esterification of terephthalic acid with ethylene glycol or 1:4 butanediol. This application is a continuation-in-part of our application, Serial No. 560,884, filed January 23, 1956.

The preparation of glycol esters of terephthalic acid is well known and has led to the production, following a polycondensation reaction, of valuable synthetic fibre and film-forming materials. Generally speaking, the commercial production of the initial terephthalic acid glycol esters is carried out by the transesterification of a dialkyl terephthalate, generally dimethyl terephthalate, or diethyl terephthalate, with the desired glycol. This process is described in U.S. Patent 2,465,319. While this method produces suitable esters for the subsequent polycondensation, i.e. chain-lengthening, reaction, it has of course the disadvantage that the terephthalic acid must first be converted to the dialkyl ester before the glycol ester can be made. The elimination of this preliminary esterification of the acid with a monohydroxy alcohol is one of the objects of this invention.

Previous attempts have been made to produce satisfactory glycol terephthalate esters by the direct esterification of terephthalic acid with the glycol. For instance U.S. Patent 2,465,319 also discloses the esterification of terephthalic acid with ethylene glycol under reflux. However, in order to obtain substantially complete esterification according to that process, it was found necessary to continue the refluxing for some seventy-two hours. It is well known that esterfication processes may be expedited by the introduction of dehydrating compounds, the most commonly used being mineral acids such as sulphuric acid. However, the terephthalic acid-glycol reaction is integrated with the subsequent polycondensation which is carried out at a higher temperature and no glycol terephthalate esters are actually separated or purified. The presence of mineral acids or other dehydrating compounds is therefore very undesirable since their presence causes discolouration or even charring of the polymer. Furthermore such catalysts also promote etherification of the glycol which is undesirable. The problems associated with etherification side reactions are more fully described hereinafter and in our continuation-in-part application based on Serial Numbers 587,461 and 692,584. It is an object of this invention to provide a process for the direct esterification where the use of a catalyst is unnecessary.

The integration of the esterification and polycondensation steps has, apart from making the presence of an esterification catalyst undesirable, the effect of making the purity of terephthalic acid a most important consideration. Impurities present in terephthalic acid are carried through into the final polymer where they cause discolouration. It is therefore necessary to use terephthalic acid of high purity when making polymers by such processes for film and textile applications. The manufacture of terephthalic acid of a sufficiently high degree of purity has provided considerable difficulty and it is for this reason that a dialkyl ester of terephthalic acid is commonly used as starting material. However improved methods of making terephthalic acid now becoming available give products of a very high degree of purity. It will be appreciated that a process starting directly from terephthalic acid will have many economic advantages over one in which the acid must be converted to the dialkyl ester before being reacted with the glycol.

In order to understand this invention, it is important to realise that merely achieving the esterification of terephthalic acid with a glycol is not enough to provide a product which is suitable for the subsequent polycondensation reaction leading to the production of fibre and film-forming materials. In order to achieve that ultimate objective, it is necessary that the acid be esterified to the desired degree and from while at the same time eliminating to the greatest extent possible the occurrence of side reactions, such as the formation of polyglycols by etherification. The respective reactions just discussed may be represented by the following equations (illustrated with ethylene glycol, the analogous reactions taking place when 1:4 butanediol is used except where otherwise stated):

(1)

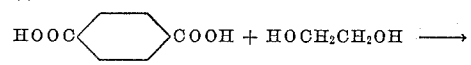

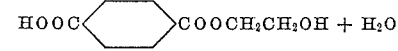

(2)

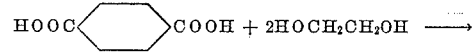

(3)

$2HOCH_2CH_2OH \longrightarrow HOCH_2CH_2OCH_2CH_2OH + H_2O$, etc.

With 1:4-butanediol, the ether forming side reaction corresponding to (3) leads to the production of tetrahydrofuran, (4) 

Polycondensation of the products of reactions 1 and 2 lead to the ultimate desired polymeric esters having the formula, (5)

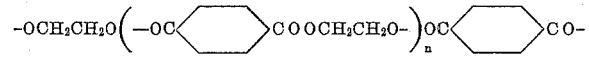

where $n$ indicates the number of repeating chain units.

From a consideration of the above equations, it will be noted that in each instance water is eliminated as a by-product, either from the esterification reaction or from the ether-forming reaction. As will be discussed hereinafter, this water formation can be used as a means of determining the end-point of the reaction provided etherification is minimised.

In its broadest sense, the invention lies in the discovery that if terephthalic acid is reacted with ethylene glycol or 1:4 butanediol under superatmospheric pressure at temperatures above the normal boiling point of the glycol employed, a degree of esterification is obtained comparable to that which results from operation at atmospheric pressure, but in a much shorter reaction time. In addition, however, this invention also lies in the discovery that, when the reaction is carried out in a manner just described, an esterification product having the desired characteristics for the subsequent polycondensation reaction is obtained. That is, it is also found that, when the reaction is conducted in this fashion the polyesters thereby prepared show greatly improved colour characteristics, a higher softening point, and a minimum quantity of polyglycol ether units, as compared to carrying out the reaction at atmospheric pressure with or without a catalyst. These completely unexpected and unpredictable results from this invention may be achieved by direct esterification of terephthalic acid which has, therefore, become an important commercial process for the first time.

In practising this invention, several important criteria must be considered and will now be discussed.

It is evident that the precise composition of the terephthalic acid/glycol reaction product is dependent upon the ratio of glycol to acid initially used, and also on the degree of completion to which the reaction is taken. For example, the formation of di(beta-hydroxyethyl) terephthalate is discouraged by lower diol/acid ratios, particularly below molar ratios of about 2:1. It such instances, i.e. where such a low ratio were used, the elimination of more than one mol of water per mol of terephthalic acid starting material would indicate the production of di(beta-hydroxyethyl) terephthalate or of esters of higher molecular weight. The most economical route to these polyalkylene terephthalates would be through the formation of the monoester, followed by loss of water only, as follows:

(6a)

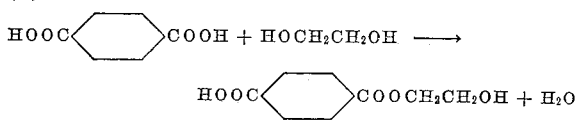

(6b)

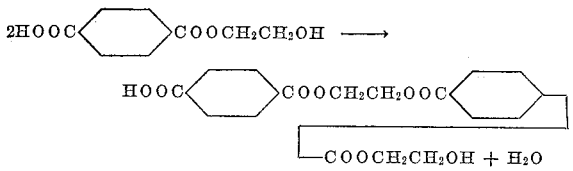

In order to achieve a process which will operate as near as possible according to this ideal mechanism, it is preferred that in the present invention the esterification is carried out at the lowest possible diol/acid molar ratio. While the use of a 1/1 diol/acid molar ratio is the theoretical target this can only be efficient in practise if a perfect separation of water from all the other reactants is achieved. This is not readily attainable so that a diol/acid molar ratio in the range 1.1–1.3/1.0 is more reasonable. With 1:4 butanediol an increased ratio of the order 2.0–2.5/1.0 is, in fact, desirable to compensate for the ready formation of tetrahydrofuran. However, in continuous or semi-continuous operations of the process of this invention, using either diol, it is sometimes desirable to operate at higher diol/acid molar ratios, for instance up to 3.0/1.0, in order to facilitate feeding of the diol/acid slurry charge to the reaction. Generally speaking then, this invention may be carried out in diol/acid molar ratios between 1.0/1.0 and 3.0/1.0.

It will be apparent from the above equations, for instance (6a), that at least one mol of water must be formed during the esterification process for each mol of acid used. In practice, larger amounts are in fact collected due to the occurrence of reactions according to equations like (6b). The formation of this water affects the operating pressure for the reaction. The minimum working pressure for conducting the esterification according to this invention is determined by the vapour pressure of the unreacted diol at the temperature concerned. Any pressure developed above this value must be caused by the formation of water in the reaction. It will be seen, therefore, that the progress of the reaction may be followed by the pressure developed in the reaction vessel. When the reaction proceeds to the point where further excess pressure build-up no longer occurs, this point may be regarded as the end-point for the esterification, or at least the point at which esterification has taken place to an adequate extent to provide a product suitable for subsequent polycondensation procedures. In the following table, the comparative vapour pressures of ethylene glycol and water over the temperature range from 200 to 300° C. are given.

| Temperature (° C.) | Vapour pressure of ethylene glycol (p.s.i.g.) | Vapour pressure of water (p.s.i.g.) |
|---|---|---|
| 200 | 1 | 210 |
| 220 | 15 | 320 |
| 230 | 23 | 390 |
| 240 | 32 | 470 |
| 250 | 42 | 560 |
| 260 | 58 | 670 |
| 270 | 74 | 780 |
| 280 | 94 | 910 |
| 300 | 145 | 1230 |

According to one method of operation of this invention, the excess pressure build-up, above the pressure developed by the diol at such reaction temperature, may be bled off through a suitable release valve. However, it is not necessary to adhere rigidly to operation close to the diol vapour pressure throughout. As will be indicated hereinafter, operating at a generally increasing reaction temperature is preferred, and in this embodiment, the operation of the esterification reaction can be facilitated by selecting a pressure value corresponding to a point high in the temperature range, as indicated by the above table, and bleeding off excess pressure (i.e. removing water vapour) only when the value is reached.

The temperature of the reaction may lie anywhere between the normal boiling point of diol and 300° C. Above 300° C., it has been found that decomposition becomes excessive and, consequently, it is most advantageous to complete the esterification reaction at a temperature close to that required for subsequent polycondensation. Thus, in the preparation of polyethylene terephthalate, it is preferred to carry out the esterification over the temperature range of about 197° to about 275° C. For the preparation of polytetramethylene terephthalate, the preferred temperature range is from about 230° to about 260° C.

Since the esters produced by the process of the present invention are not isolated but are directly polycondensed to provide film and fibre-forming materials it is important to consider the advantages of the product herewith provided as part of the complete terephthalic acid to polymer conversion. It has been found that polyesters of a molecular weight required for commercial film and fibre products are very readily obtained by polycondensing the product of the process of this invention according to conventional techniques, i.e. at elevated temperatures and under reduced pressure. It has further been found that when the process of the instant invention is used in conjunction with such conventional polycondensation the overall reaction time is much shorter than the time required for the preparation of the same polymers by the transesterification route from dialkyl terephthalates. This transesterification route as described in United States specification 2,465,319, British patent specification No. 590,451 and elsewhere has the further disadvantage of requiring the presence of a metallic compound as catalyst for both transesterification and polycondensation stages. The presence of such metallic compounds in the final polymer has an adverse influence on colour and thermal stability. Glycol terephthalate esters may be made by the process of our invention without the assistance of a catalyst and are accordingly free of metals or metallic compounds. Our esters may also be polycondensed without the assistance of a catalyst since the carboxyl groups of beta-hydroxyethyl hydrogen terephthalate provide hydrion which themselves promote the polycondensation reaction. In order to attain a high molecular weight quickly, however, we prefer to add a small amount of a compound of antimony since such compounds are comparatively innocuous towards polymer colour and stability.

As previously indicated, the polyesters resulting from using the process of the instant invention are considerably superior in colour and have a higher softening point than polyesters from a glycol terephthalate ester obtained by the much slower esterification under atmospheric pressure.

same degree in all cases, i.e. to an intrinsic viscosity of 0.63 to 0.68, the end point being determined by measurement of power required to turn the agitator in the polymer melt.

The attached table gives details of a range of experiments, in some of which very small amounts of alkali were added to the esterification, carried out under the above conditions.

| No. | Ethylene glycol (parts) | Terephthalic Acid (parts) | Glycol/ Acid Ratio (mol) | Added Alkali (parts) | Esterification | | | Polycondensation Time (mins.) | Total Time | | Polymer | | |
|---|---|---|---|---|---|---|---|---|---|---|---|---|---|
| | | | | | Temperature (° C.) | Pressure (p.s.i.g.) | Time (mins.) | | hrs. | mins. | S. pt. (° C.) | Mols Percent Diglycol Units | Colour |
| 1 | 775 | 830 | 2.5/1.0 | | 220-250 | 40-50 | 60 | 115 | 2 | 55 | 252 | 4 | 1.8 |
| 2 | 775 | 830 | 2.5/1.0 | 1.0 NaOH | 220-250 | 40-50 | 85 | 140 | 3 | 45 | 261 | <2 | 2.0 |
| 3 | 620 | 830 | 2.0/1.0 | | 200-250 | 40-50 | 100 | 125 | 3 | 45 | 260 | 2 | 1.5 |
| 4 | 620 | 830 | 2.0/1.0 | 0.02 NaOH | 200-250 | 40-50 | 100 | 120 | 3 | 40 | 261.5 | <2 | 1.8 |
| 5 | 620 | 830 | 2.0/1.0 | | 200-300 | 40-150 | 50 | 80 | 2 | 10 | 255 | 4 | 2.7 |
| 6 | 620 | 830 | 2.0/1.0 | | 200-230 | 30-35 | 125 | 120 | 4 | 05 | 252 | 4 | 2.5 |
| 7 | 465 | 830 | 1.5/1.0 | | 200-275 | 40-80 | 70 | 80 | 2 | 30 | 259 | <2 | 1.5 |
| 8 | 465 | 830 | 1.5/1.0 | 0.02 CaO | 200-275 | 40-80 | 80 | 75 | 2 | 35 | 262 | <2 | 1.4 |
| 9 | 434 | 830 | 1.4/1.0 | | 200-275 | 40-80 | 65 | 80 | 2 | 25 | 258 | 2-4 | 1.5 |
| 10 | 403 | 830 | 1.3/1.0 | 0.02 CaO | 200-275 | 40-80 | 100 | 90 | 3 | 10 | 262 | <2 | 1.0 |
| 11 | 403 | 830 | 1.3/1.0 | | 200-275 | 40-80 | 80 | 70 | 2 | 30 | 260 | 2 | 1.5 |
| 12 | 372 | 830 | 1.2/1.0 | 0.01 CaO | 200-275 | 40-80 | 70 | 75 | 2 | 25 | 262 | <2 | 1.5 |

Notes:
(1) In all these experiments 0.166 part antimony trioxide was added before polycondensation.
(2) In experiment (5) polymerisation was carried out in part while the temperature was falling from 300° C. to 275° C.

Reference has already been made to the importance in these glycolisation processes of the etherification side reactions shown in Equations 3 and 4. The structural stability of the five membered ring compound tetrahydrofuran enables reaction 4 to proceed very readily. When polytetramethylene terephthalates are desired it is advantageous to conduct the reaction in the presence of a small amount of sodium or potassium hydroxide. However, the introduction of very small amounts of alkali is also valuable in the manufacture of polyethylene terephthalate. Here polyglycols produced according to reaction 3 are higher boiling than ethylene glycol and become incorporated in the final polymer causing depression of softening point and deterioration in colour. The presence of alkali has a marked effect in reducing polyglycol formation. As much alkali as 0.5 mol percent of terephthalic acid charged may be used, but very small amounts of alkali have been found to bring about an increase in the softening point of the final product, for instance as little as 0.004 mol percent.

Although the above description of the process of this invention has been generally described as a batch process, this invention particularly lends itself to semi-continuous or continuous operation. In this technique, a continuous feed of glycol/terephthalic acid, of the desired composition is fed into the reaction vessel, and the excess pressure is released through suitable valving devices, with of course the removal of water vapour thereby to maintain the optimum operating pressure.

In order to further illustrate this invention, the following examples will indicate the method of operation under particular conditions. It will, of course, be appreciated that the invention is not in any way limited to the specific reaction conditions and procedures set forth therein. In these examples, all parts and percentages are by weight.

*Example 1*

Terephthalic acid and ethylene glycol were reacted in a stirred autoclave fitted with vapour off-take valve attached to an efficient condenser. Water formed in the esterification was bled off at a specified pressure together with a small amount of ethylene glycol. Completion of esterification was determined by failure of the reaction to develop further pressure above the specified level. The release valve was then opened and any gross excess of ethylene glycol allowed to distil out. After addition of catalyst polycondensation was then carried out at temperature 275–280° C. and 0.2 mm. Hg to substantially the same degree in all cases, i.e. to an intrinsic viscosity of 0.63 to 0.68, the end point being determined by measurement of power required to turn the agitator in the polymer melt.

*Example 2*

830 parts terephthalic acid (5 mol) and 775 parts ethylene glycol (12.5 mol) were reacted at 200–250° C. in a stirred autoclave fitted with a short fractionating column, condenser and receiver suitable for operation under pressure. The system was vented to atmosphere during the initial heating to 200° C. then the pressure was increased to 55 p.s.i.g. with deoxidised nitrogen. As esterification proceeds water was distilled from the column top at temperature 150–155° C., pressure being maintained at 55 p.s.i.g. throughout. The reaction was completed in 150 minutes, the subsequent polycondensation procedure over 120 minutes being the same as in Example 1. The final polyester had I.V.=0.62; softening point 258° C. and colour 1.8.

*Example 3*

830 parts terephthalic acid (5 mol) and 341 parts ethylene glycol (5.5 mol) were reacted at 200–275° C. The equipment used was the same as in Example 2, a pressure of 55 p.s.i.g. deoxidised nitrogen again being used. Reaction was completed in 65 minutes. The pressure was then released, 0.166 part antimony trioxide added, and the reaction vessel placed under 0.2 mm. Hg vacuum. After one hour a polyester having I.V.=0.59, softening point 261° C. and colour 1.25 was obtained.

*Example 4*

830 parts terephthalic acid (5 mol) and 310 parts ethylene glycol (5.0 mol) were reacted under the same conditions as those in Example 3. No further distillation of water was apparent after ¾ hour. The reaction vessel was then held under 0.2 mm. vacuum for 15 minutes with continued agitation before discharging the polyester. This had I.V.=0.43, softening point 261° C. and colour 1.5.

*Example 5*

An ethylene glycol/terephthalic acid slurry of molar ratio 3.0/1.0 was continuously fed to a cascade reactor operating at temperature 230–235° C. The volatiles formed in the reaction were removed from the top of the reactor through a reflux column and valve at the rate required to maintain a steady pressure of 50 p.s.i.g. in the reactor. At the same time the products of esterification were continuously taken from the bottom of the cascade and polycondensed at 275° C. and 0.2 mm. pressure after introduction of 0.04% (wt.) of antimony trioxide.

In this way polymer of softening point 257° C., I.V. 0.60 and colour 2.0 was consistently produced.

*Example 6*

830 parts terephthalic acid (5 mol), 1125 parts 1:4 butanediol (12.5 mol) and 0.04 part sodium hydroxide were reacted over the range 230–260° C. in a stirred autoclave. The pressure was maintained at 50–60 p.s.i.g. throughout, the water formed in the reaction together with any by-product tetrahydrofuran being periodically bled-off. After about one hour the rate of pressure build-up falls off and eventually ceases. Pressure is then let down to 1 atmosphere, 0.25 antimony trifluoride added and the remaining esters polycondensed at 260° C. and 0.2 mm. pressure over a period of 135 minutes. Polytetramethylene terephthalate having I.V. 0.52 and softening point 226° C. was obtained.

Similar results were obtained when 0.28 part potassium hydroxide and 0.28 part calcium oxide respectively were used in place of the sodium hydroxide in the above experiment.

*Example 7*

830 parts terephthalic acid (5 mol) and 1125 parts 1:4 butanediol (12.5 mol) were reacted over the range 230–260° C. in a stirred autoclave. The pressure was maintained at 60 p.s.i.g. by bleeding-off water and tetrahydrofuran. Much greater quantities of tetrahydrofuran were formed than in Example 6 and the reaction was more difficult to control. After about one hour no further excess of pressure built up, the autoclave was vented to atmosphere and the residual terephthalate esters were polycondensed at 260° C. and 0.2 mm. pressure in the presence of 0.03% (by weight of terephthalic acid) of antimony trifluoride over a period of three hours. Polytetramethylene terephthalate having intrinsic viscosity 0.40 and softening point 224° C. was obtained.

The following comparative examples are included to illustrate the advantages of the process of our invention.

*Comparative Example A*

In order to obtain a comparable esterification time at 197° C. to those achieved in Example 1 it is necessary to use 3720 parts ethylene glycol/830 parts terephthalic acid (12/1 mol) with water formed being continually distilled from the reaction under atmospheric pressure. The polyethylene terephthalate eventually obtained by polycondensation at 275° C. and 0.2 mm. in the presence of 0.166 part antimony trioxide over a period of 2½ hours had I.V. 0.62, colour 3.0, softening point 240° C. and a diglycol content of 10 mols percent estimated by infra-red analysis.

A polymer showing a high content of ether links and corresponding depression in softening point is of much reduced value in fibre and film applications largely because of poor thermal and light stability. Reproducibility of I.V. and softening point under manufacturing conditions is also rendered very difficult with such an impure product.

*Comparative Example B*

Ester-interchange between 920 parts dimethyl terephthalate and 775 parts ethylene glycol in the presence of 0.184 part zinc acetate was carried out over the temperature range 155–200° C. in a stirred reaction vessel. Methanol was separated from the reaction immediately following its formation by distillation via a short fractionating column. Time required for ester-interchange was 3½ hours. The glycol esters obtained in this way were polycondensed after the addition of 0.166 part antimony trioxide at 275° C. and 0.2 mm. The time required to reach I.V. 0.65 was 90 minutes giving a total time of 5 hours.

The polymer obtained by ester-interchange in this way had softening point 261.5° C. and colour 2.6.

In these examples the scale of polymer colour used was an arbitrary one 0–3, where 0=white and 3=pale amber, the figures quoted being the mean of four assessments by different operators.

The intrinsic viscosity measurements were carried out in 1% solution in ortho-chlorophenol at 25° C. and serve as a measure of the degree of polycondensation. In fibre and film applications it is generally accepted that for polyethylene terephthalate an intrinsic viscosity in the range 0.6–0.7 is preferable though useful products may still be obtained at values as low as 0.4.

From these examples it can be seen that the glycol terephthalate esters obtained using the process of our invention are superior to the esters obtained under atmospheric pressure conditions. Reaction is much facilitated by the use of elevated temperature and pressure and polyesters may be prepared having better colour, higher softening point and containing less diglycol units than polyesters obtained from glycol terephthalates prepared under atmospheric pressure conditions. It will also be seen from Comparative Example B that production of glycol terephthalate esters by ester-interchange under typical conditions takes appreciably longer than by our direct superatmospheric pressure process and that the derived polyester is at the worst end of our colour scale.

We claim:

1. A method of esterifying terephthalic acid with a glycol selected from the group consisting of ethylene glycol and 1,4-butanediol comprising heating a mixture consisting essentially of terephthalic acid and from one to three molar proportions of said glycol at a temperature between the normal boiling point of said glycol and 300° C. and under a superatmospheric pressure of at least about the partial vapor pressure of said glycol but not exceeding the sum of the partial vapor pressures of the said glycol and the water produced in the reaction, said partial vapor pressures being those at the temperature of the reaction.

2. A process as set forth in claim 1 wherein said process is operated continuously.

3. A process as set forth in claim 1 wherein said glycol is ethylene glycol.

4. A process as set forth in claim 3 wherein the ratio of ethylene glycol to terephthalic acid is 1.2:1 and wherein the temperature is between about 200 and 275° C.

5. A process as set forth in claim 4 including distilling water from the reaction.

6. A process as set forth in claim 1 wherein said glycol is 1,4-butanediol.

7. A process as set forth in claim 6 in which the molar ratio of terephthalic acid to 1:4-butanediol is 1:2.5 and the temperature is between about 230° C. and 260° C.

8. A process as set forth in claim 7 in which the reaction products include tetrahydrofuran as a by-product and including distilling water and tetrahydrofuran from the reaction.

References Cited in the file of this patent

UNITED STATES PATENTS

| | | |
|---|---|---|
| 2,459,014 | Cavanaugh et al. | Jan. 11, 1949 |
| 2,465,319 | Whinfield | Mar. 22, 1949 |
| 2,479,066 | Gresham | Aug. 16, 1949 |
| 2,647,885 | Billica | Aug. 4, 1953 |
| 2,742,494 | Mraz | Apr. 17, 1956 |
| 2,766,273 | Bruins et al. | Oct. 9, 1956 |
| 2,951,060 | Billica | Aug. 30, 1960 |

OTHER REFERENCES

Groggins: Unit Processes in Organic Synthesis 4th ed., page 615, McGraw-Hill Book Co., Inc., New York, 1952.

Dedication 3,050,533.—*Neil Munro* and *Duncan Maclean*, Harrogate, England. MANUFACTURE OF ESTERS. Patent dated Aug. 21, 1962. Dedication filed Feb. 2, 1978, by the assignee, *Imperial Chemical Industries Limited*.

Hereby dedicates to the Public the remaining term of said patent.

[*Official Gazette April 4, 1978.*]